(12) United States Patent
Zhang et al.

(10) Patent No.: US 12,031,825 B2
(45) Date of Patent: Jul. 9, 2024

(54) CALIBRATION-FREE POSITIONING METHOD AND SYSTEM

(71) Applicant: NOLO CO., LTD., Beijing (CN)

(72) Inventors: Yiming Zhang, Beijing (CN); Jianing Zhang, Beijing (CN); Daoning Zhang, Beijing (CN)

(73) Assignee: Nolo Co., Ltd., Beijing (CN)

( * ) Notice: Subject to any disclaimer, the term of this patent is extended or adjusted under 35 U.S.C. 154(b) by 927 days.

(21) Appl. No.: 17/043,106

(22) PCT Filed: Mar. 22, 2019

(86) PCT No.: PCT/CN2019/079311
§ 371 (c)(1),
(2) Date: Dec. 22, 2020

(87) PCT Pub. No.: WO2019/184830
PCT Pub. Date: Oct. 3, 2019

(65) Prior Publication Data
US 2021/0102811 A1    Apr. 8, 2021

(30) Foreign Application Priority Data

Mar. 30, 2018 (CN) .......................... 201810287917.2

(51) Int. Cl.
*G01C 21/16* (2006.01)
*G01P 15/18* (2013.01)
*G02B 27/01* (2006.01)

(52) U.S. Cl.
CPC ....... *G01C 21/1652* (2020.08); *G01C 21/166* (2020.08); *G01P 15/18* (2013.01); *G02B 27/0176* (2013.01)

(58) Field of Classification Search
CPC .............. G01C 21/1652; G01C 21/166; G01C 21/16; G01P 15/18; G02B 27/0176
See application file for complete search history.

(56) References Cited

U.S. PATENT DOCUMENTS 4,737,794 A    4/1988 Jones
8,781,776 B2 *  7/2014 Onda ..................... G01C 21/28
                                                      702/94

(Continued)

FOREIGN PATENT DOCUMENTS

CN    102445200 A    5/2012
CN    103186257 A    7/2013

(Continued)

OTHER PUBLICATIONS

Zhang, Jun, "Quaternion and Rotational Matrix in Three-dimensional Vector Rotation Process of Mutual Transformation Algorithm and Program Design", Yinshan Academic Journal, Sep. 30, 2012, p. 11-14, vol. 26, No. 3, yin shan xue kan bian ji bu, China.

(Continued)

*Primary Examiner* — Yaritza Guadalupe-McCall
(74) *Attorney, Agent, or Firm* — David B. Tingey; K. Russell Griggs; Kirton McConkie

(57) ABSTRACT

Provided is a calibration-free positioning method and system. The positioning method includes: setting a positioning period, acquiring a first coordinate of a positioned object in a base station coordinate system at the end of one positioning period, performing an inertial navigation within the one positioning period to obtain a first inertial navigation result; controlling, within a next positioning period, the positioned object to move to obtain a second coordinate in the base station coordinate system at the end of the next positioning period, performing an inertial navigation on the positioned object within the positioning period to obtain a second inertial navigation result, and calculating displacement vectors in the base station coordinate system and in the inertial navigation coordinate system; calculating a rotation quaternion; transforming, through the rotation quaternion, a coordinate obtained by the inertial navigation to the base station (Continued)

coordinate system, output a position of the positioned object after transforming.

20 Claims, 3 Drawing Sheets

(56) References Cited

U.S. PATENT DOCUMENTS

| | | | |
|---|---|---|---|
| 8,825,435 B2* | 9/2014 | Smid | G01C 21/1652 |
| | | | 73/488 |
| 11,085,170 B2* | 8/2021 | Roulston | E02F 3/841 |
| 11,105,634 B2* | 8/2021 | McIntire | G01C 21/20 |
| 11,395,103 B2* | 7/2022 | Tegerdine | H04W 4/029 |
| 11,573,085 B2* | 2/2023 | Tegerdine | G01C 21/362 |
| 11,573,086 B2* | 2/2023 | Lee | G01C 25/005 |
| 2019/0370550 A1* | 12/2019 | Chen | G06V 20/20 |
| 2020/0294401 A1* | 9/2020 | Kerecsen | G05D 1/0287 |
| 2021/0102811 A1* | 4/2021 | Zhang | G01P 15/18 |
| 2021/0247189 A1* | 8/2021 | Tsujii | G06N 20/00 |

FOREIGN PATENT DOCUMENTS

| | | |
|---|---|---|
| CN | 104703130 A | 6/2015 |
| CN | 104869639 A | 8/2015 |
| CN | 105547288 A | 12/2015 |
| CN | 106767830 A | 5/2017 |
| CN | 107037880 A | 8/2017 |
| CN | 107300385 A | 10/2017 |
| CN | 107314778 A | 11/2017 |
| CN | 107330862 A | 11/2017 |
| CN | 107346013 A | 11/2017 |
| CN | 107517372 A | 12/2017 |
| CN | 108917751 A | 11/2018 |
| WO | 2017086841 A1 | 5/2017 |
| WO | WO-2021238804 A1 * | 12/2021 ........... H04N 5/2224 |

OTHER PUBLICATIONS

Second Office Action of Prior Application CN 201810287917.2.
International Search Report (PCT/CN2019/079311); Date of Completion: May 9, 2019; Date of Mailing: May 30, 2019.
First Search Report of Prior Application (CN 201810287917.2; Filed Mar. 30, 2018).
First Office Action of Prior Application CN 201810287917.2).

* cited by examiner

CALIBRATION-FREE POSITIONING METHOD AND SYSTEM

CROSS-REFERENCE TO RELATED APPLICATIONS

This is a National Stage Application filed under 35 U.S.C. 371 based on International Patent Application No. PCT/CN2019/079311, filed on Mar. 22, 2019, which claims priority to Chinese Patent Application No. 201810287917.2 filed on Mar. 30, 2018, the disclosures of both of which are incorporated herein by reference in their entireties.

TECHNICAL FIELD

This application relates to, but is not limited to, the technical field of spatial positioning, in particular, to a calibration-free positioning method and system.

BACKGROUND

In recent years, related technologies and industries of positioning services are developing to indoors, especially in the fields of Virtual Reality (VR) and Augmented Reality (AR), positioning technologies have become the basis of the interactions of VR and AR. Currently, positioning technologies in the fields of VR and AR include infrared optical positioning, visible light positioning and laser positioning. The interaction is usually performed by using handles, gloves or other holding devices.

When performing a positioning calculation, calibration is required to be performed first, a position and a direction which are required to be determined are limited to a coordinate system set by a positioning base station for performing the positing calculation. However, such calibration process is cumbersome for users.

SUMMARY

Following is a summary of the subject described in the present disclosure in detail. The summary is not intended to limit the scope of the claims.

Embodiments of the present application provide a calibration-free positioning method and system, which are simple and easy to implement, and calibration can be completed without user operation.

According to a first aspect of the embodiments of the present application, a calibration-free positioning method is provided and the method includes steps described below.

In step S1, a positioning period is set, a first coordinate of a positioned object in a base station coordinate system at the end of one positioning period is acquired, and an inertial navigation is performed on the positioned object within the one positioning period to obtain a first inertial navigation result.

In step S2, the positioned object is controlled, within a next positioning period, to move to obtain a second coordinate of the positioned object in the base station coordinate system at the end of the next positioning period, the inertial navigation is performed on the positioned object within the next positioning period to obtain a second inertial navigation result, and a displacement vector in the base station coordinate system and a displacement vector in an inertial navigation coordinate system are calculated.

In step S3, a rotation quaternion is calculated according to the displacement vector in the base station coordinate system and the displacement vector in the inertial navigation coordinate system.

In step S4, a coordinate obtained by the inertial navigation is transformed, through the rotation quaternion, to the base station coordinate system, and a position of the positioned object after transforming is output.

In an exemplary embodiment, in response to using the calibration-free positioning method for power-on calibration, the step S1 may include the following steps: the first coordinate of the positioned object, which is in a stationary state, in the base station coordinate system is acquired, and the inertial navigation is performed on the positioned object.

In an exemplary embodiment, before the first coordinate of the positioned object, which is in a stationary state, in the base station coordinate system is acquired and the inertial navigation is performed on the positioned object, the calibration-free positioning method may further include steps described below.

A positioning base station is used to continuously acquire coordinates of the positioned object in the base station coordinate system.

A first time threshold is set, and in response to coordinates of the positioned object in the base station coordinate system not changing within the first time threshold, it is determined that the positioned object is in the stationary state.

In an exemplary embodiment, a velocity of the positioned object in the stationary state may be 0, and the displacement vector in the inertial navigation coordinate system obtained by performing the inertial navigation on the positioned object may be (0,0,0).

In an exemplary embodiment, the step in which the rotation quaternion is calculated according to the displacement vector in the base station coordinate system and the displacement vector in the inertial navigation coordinate system may include steps described below.

A conversion angle between the displacement vector in the base station coordinate system and the displacement vector in the inertial navigation coordinate system is calculated.

The rotation quaternion is calculated according to the conversion angle, the displacement vector in the base station coordinate system and the displacement vector in the inertial navigation coordinate system.

In an exemplary embodiment, the step in which the rotation quaternion is calculated according to the conversion angle the displacement vector in the base station coordinate system and the displacement vector in the inertial navigation coordinate system, may include the following step: the rotation quaternion is calculated by using the following formula:

$$Q = [\cos\frac{\alpha}{2}, (y_T * z_B - y_B * z_T) * \sin\frac{\alpha}{2},$$
$$(x_B * z_T - x_T * z_B) * \sin\frac{\alpha}{2}, (z_T * y_B - z_B * y_T) * \sin\frac{\alpha}{2}]$$

Here, Q is the rotation quaternion; $(x_B, y_B, z_B)$ is the displacement vector in the base station coordinate system, $(x_T, y_T, z_T)$ is the displacement vector in the inertial navigation coordinate system; $\alpha$ is the conversion angle between the displacement vector in the base station coordinate system and the displacement vector in the inertial navigation coordinate system.

In an exemplary embodiment, the step in which the conversion angle between the displacement vector in the base station coordinate system and the displacement vector in the inertial navigation coordinate system is calculated may include the following step: the conversion angle is calculated by using the following formula:

$$\alpha = \arccos \frac{x_T * x_B * + y_T * y_B + z_T * z_B}{\sqrt[2]{x_T^2 + y_T^2 + z_T^2} + \sqrt[2]{x_B^2 + y_B^2 + z_B^2}}$$

Here, $\alpha$ is the conversion angle between the displacement vector in the base station coordinate system and the displacement vector in the inertial navigation coordinate system, $(x_B, y_B, z_B)$ is the displacement vector in the base station coordinate system, and $(x_T, y_T, z_T)$ is the displacement vector in the inertial navigation coordinate system.

In an exemplary embodiment, the step in which the displacement vector in the base station coordinate system and the displacement vector in the inertial navigation coordinate system are calculated may include the following steps: the displacement vector in the base station coordinate system is obtained by subtracting the first coordinate from the second coordinate; and the displacement vector in the inertial navigation coordinate system is obtained by subtracting the first inertial navigation result from the second inertial navigation result.

In an exemplary embodiment, the step in which the coordinate obtained by the inertial navigation is transformed, through the rotation quaternion, to the base station coordinate system may include the following steps: the coordinate obtained by the inertial navigation is transformed into a quaternion format, and the coordinate with the quaternion format is multiplied by the rotation quaternion to obtain a coordinate in the base station coordinate system.

In an exemplary embodiment, the calibration-free positioning method may further include the following steps: during continuously calibrating calibration data, the steps S1 to S4 are repeated until coordinates of the positioned object in the base station coordinate system and coordinates of the positioned object in the inertial navigation coordinate system do not change within the second time threshold, and calibration positioning ends.

According to a second aspect of the embodiments of the present disclosure, a calibration-free positioning system is provided, including a processor and a memory. The memory stores a computer program, where the computer program, when executed by the processor, implements steps described below.

In step S1, a positioning period is set, a first coordinate of a positioned object in a base station coordinate system at the end of one positioning period is acquired, and an inertial navigation is performed on the positioned object within the one positioning period to obtain a first inertial navigation result.

In step S2, the positioned object is controlled, within a next positioning period, to move to obtain a second coordinate of the positioned object in the base station coordinate system at the end of the next positioning period, the inertial navigation is performed on the positioned object within the next positioning period to obtain a second inertial navigation result, and a displacement vector in the base station coordinate system and a displacement vector in an inertial navigation coordinate system are calculated.

In step S3, a rotation quaternion is calculated according to the displacement vector in the base station coordinate system and the displacement vector in the inertial navigation coordinate system.

In step S4, a coordinate obtained by the inertial navigation is transformed, through the rotation quaternion, to the base station coordinate system, and a position of the positioned object after transforming is output.

In an exemplary embodiment, in response to using the calibration-free positioning system for power-on calibration, the computer program, when executed by the processor, may further implement the following steps: the first coordinate of the positioned object, which is in a stationary state, in the base station coordinate system is acquired, and the inertial navigation is performed on the positioned object.

In an exemplary embodiment, the computer program, when executed by the processor, may further implement the following steps: a positioning base station is used to continuously acquire coordinates of the positioned object in the base station coordinate system; a first time threshold is set, and in response to coordinates of the positioned object in the base station coordinate system not changing within the first time threshold, it is determined that the positioned object is in the stationary state.

In an exemplary embodiment, a velocity of the positioned object in the stationary state is 0, and the displacement vector in the inertial navigation coordinate system obtained by performing the inertial navigation on the positioned object is (0,0,0).

In an exemplary embodiment, the computer program, when executed by the processor, implements calculating the rotation quaternion according to the displacement vector in the base station coordinate system and the displacement vector in the inertial navigation coordinate system through the following steps: a conversion angle between the displacement vector in the base station coordinate system and the displacement vector in the inertial navigation coordinate system is calculated; and the rotation quaternion is calculated according to the conversion angle, the displacement vector in the base station coordinate system and the displacement vector in the inertial navigation coordinate system.

In an exemplary embodiment, the computer program, when executed by the processor, implements calculating the rotation quaternion according to the conversion angle the displacement vector in the base station coordinate system and the displacement vector in the inertial navigation coordinate system through the following step: the rotation quaternion is calculated by using the following formula:

$$Q = [\cos\frac{\alpha}{2}, (y_T * z_B - y_B * z_T) * \sin\frac{\alpha}{2},$$
$$(x_B * z_T - x_T * z_B) * \sin\frac{\alpha}{2}, (z_T * y_B - z_B * y_T) * \sin\frac{\alpha}{2}]$$

Here, Q is the rotation quaternion; $(x_B, y_B, z_B)$ is the displacement vector in the base station coordinate system, $(x_T, y_T, z_T)$ is the displacement vector in the inertial navigation coordinate system; $\alpha$ is the conversion angle between the displacement vector in the base station coordinate system and the displacement vector in the inertial navigation coordinate system.

In an exemplary embodiment, the computer program, when executed by the processor, implements calculating the conversion angle between the displacement vector in the base station coordinate system and the displacement vector in the inertial navigation coordinate system through the following step: the conversion angle is calculated by using the following formula:

$$\alpha = \arccos \frac{x_T * x_B * + y_T * y_B + z_T * z_B}{\sqrt[2]{x_T^2 + y_T^2 + z_T^2} + \sqrt[2]{x_B^2 + y_B^2 + z_B^2}}$$

Here, $\alpha$ is the conversion angle between the displacement vector in the base station coordinate system and the displacement vector in the inertial navigation coordinate system, $(x_B, y_B, z_B)$ is the displacement vector in the base station coordinate system, and $(x_T, y_T, z_T)$ is the displacement vector in the inertial navigation coordinate system.

In an exemplary embodiment, the computer program, when executed by the processor, implements calculating the displacement vector in the base station coordinate system and the displacement vector in the inertial navigation coordinate system through the steps described below.

The displacement vector in the base station coordinate system is obtained by subtracting the first coordinate from the second coordinate; and the displacement vector in the inertial navigation coordinate system is obtained by subtracting the first inertial navigation result from the second inertial navigation result.

In an exemplary embodiment, the computer program, when executed by the processor, further implements the following steps: during continuously calibrating calibration data, the steps S1 to S4 are repeated until coordinates of the positioned object in the base station coordinate system and coordinates of the positioned object in the inertial navigation coordinate system do not change within the second time threshold, and calibration positioning ends.

In addition, the embodiments of the present application further provide a computer-readable storage medium, storing a computer program, where the computer program, when executed by a processor, implementing the steps of the calibration-free positioning method provided in the above-mentioned first aspect.

According to the calibration-free positioning method provided by the embodiments of the present disclosure, the rotation quaternion is calculated by obtaining the displacement vector of the positioned object in the base station coordinate system and the displacement vector of the positioned object in the inertial navigation coordinate system; the coordinate obtained by the inertial navigation is transformed, through the rotation quaternion, to the base station coordinate system and the position of the positioned object after transforming is output. On the basis of ensuring positioning accuracy, the positioning method greatly reduces the complexity of calibration and improves the user experience. This method is not only suitable for the power-on calibration, but also for continuously calibrating calibration data during use.

After reading and understanding the accompanying drawings and detailed description, other aspects can be understood.

DETAILED DESCRIPTION

The technical content of the present application is to be described in detail below in conjunction with the accompanying drawings and embodiments.

The embodiments choose to describe in the field of VR positioning. It is to be understood that the calibration-free positioning method can be applied to not only the field of VR, but also the field of three-dimensional space positioning, such as AR, Mixed Reality (MR), and drones.

In the field of VR, to ensure user experience in a virtual environment, there are certain requirements for operation continuity and real-time response capability, which requires fast processing speed for various types of data and accurate positioning of operations, and it needs to be ensured that it is always within a coordinate system (i.e., a base station coordinate system) set by a positioning base station during a positioning process. In the calibration-free positioning method provided by the embodiments of the present application, calibration is not performed after power-on of the positioning base station and the positioned object (e.g. handles of VR interaction application). A user controls the positioned object to move and performs an inertial navigation through an Inertial Measurement Unit (IMU) in the positioned object to obtain displacement information in an inertial navigation coordinate system, that is, a three-dimensional vector. The displacement information of the positioned object relative to the base station coordinate system during the movement of the positioned object may also be obtained through base station positioning, that is, a second three-dimensional vector. If calibration is not performed, the two three-dimensional vectors have basically the same module length but have different directions, and the angle between the two three-dimensional vectors is calibration information. The calibration is completed by compensating the angle between the two three-dimensional vectors of the positioned object. On the basis of ensuring positioning accuracy, this method greatly reduces the complexity of calibration and improves the user experience. This method is not only suitable for power-on calibration, but also for continuous calibrating calibration data during use.

Figure 1:
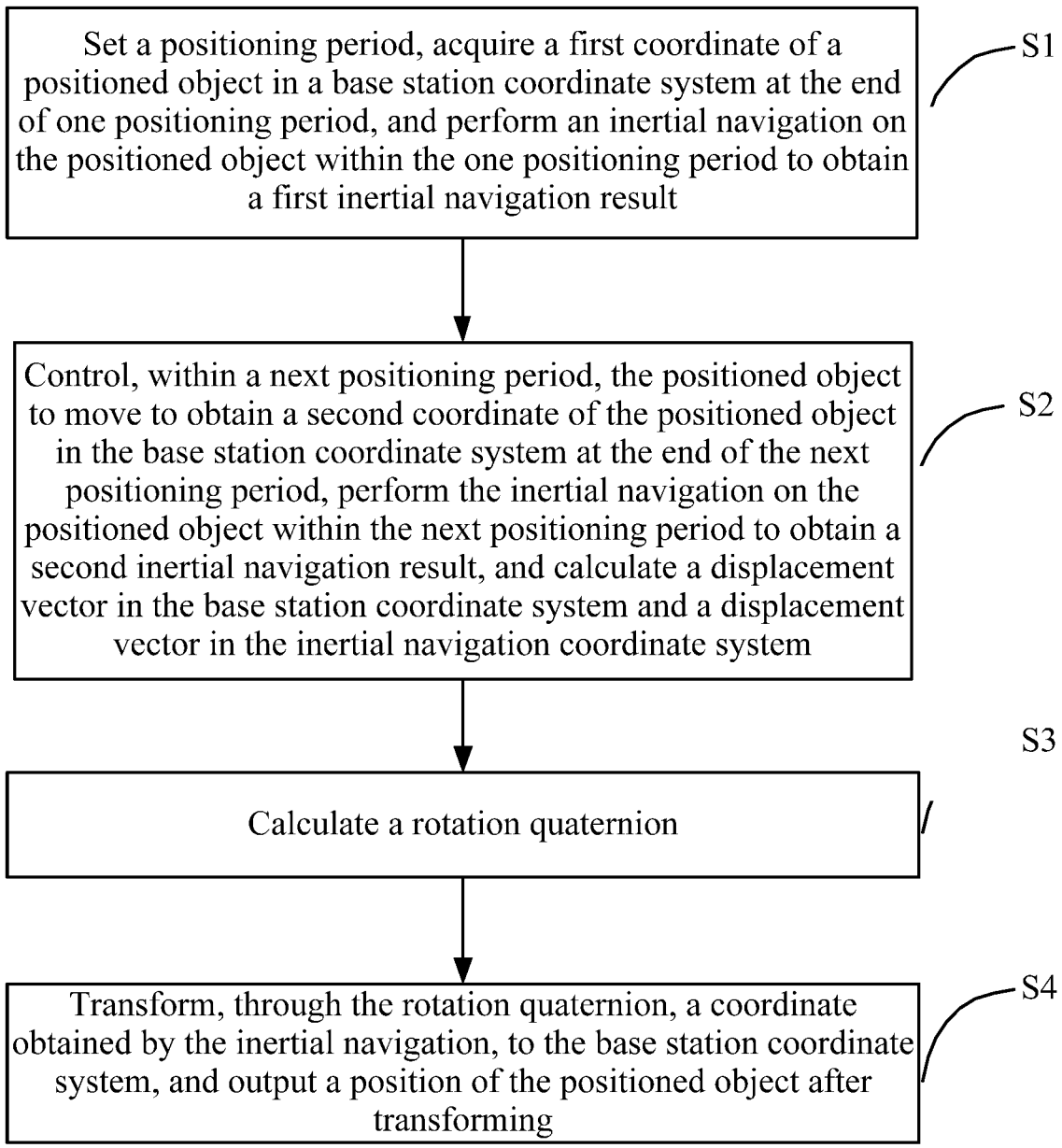
FIG. 1 is a flowchart of a calibration-free positioning method according to an exemplary embodiment of the present application.

As shown in FIG. 1, the calibration-free positioning method provided by the embodiment includes the following steps: in step S1, a positioning period is set, a first coordinate B1 of a positioned object in a base station coordinate system at the end of one positioning period is acquired, and an inertial navigation is performed on the positioned object within the one positioning period to obtain a first inertial navigation result T1; in step S2, the positioned object is controlled, within a next positioning period, to move to obtain a second coordinate B2 of the positioned object in the base station coordinate system at the end of the next positioning period, the inertial navigation is performed on the positioned object within the next positioning period to obtain a second inertial navigation result T2, and a displacement vector $P_B$ in the base station coordinate system and a displacement vector $P_T$ in the inertial navigation coordinate system are calculated; in step S3, a rotation quaternion is calculated according to the displacement vector $P_B$ in the base station coordinate system and the displacement vector $P_T$ in the inertial navigation coordinate system; and in step S4, a coordinate obtained by the inertial navigation is transformed, through the rotation quaternion, to the base station coordinate system, and a position of the positioned object after transforming is output. This process is described in detail below.

In the step S1, the positioning period is set, the first coordinate B1 of the positioned object in the base station coordinate system at the end of one positioning period is acquired, and the inertial navigation is performed on the positioned object within the one positioning period to obtain the first inertial navigation result T1.

The positioning period is set according to actual requirements, and positioning calibration is performed once within one positioning period. In a VR environment, the first coordinate B1 of the positioned object in the base station coordinate system at the end of one positioning period is acquired, and the inertial navigation is performed on the positioned object within the one positioning period. The inertial navigation is a technology that obtains an instantaneous velocity and an instantaneous position of the positioned object by measuring a acceleration of the positioned object and performing an integral operation automatically.

The calibration-free positioning method provided by this embodiment is not only suitable for power-on calibration, but also for continuous calibrating calibration data during use. In response to using the method for the power-on calibration, in the VR environment, the first coordinate B1 of the positioned object, which is in a stationary state, in the base station coordinate system is acquired, the velocity is set to 0 and the inertial navigation is performed on the positioned object. No calibration is required in the case of determining the 0-velocity time. In response to coordinates B in the base station coordinate system remain not changing continuously, it is the 0-velocity time, i.e., the stationary state. The coordinate B at this time as the first coordinate B1, the velocity is set to 0 and the inertial navigation is performed on the positioned object.

The positioned object being in the stationary state may be determined in the following manners: a positioning base station is used to continuously acquire coordinates of the positioned object in the base station coordinate system; a first time threshold is set, and in response to coordinates of the positioned object in the base station coordinate system not changing within the first time threshold, it is determined that the positioned object is in the stationary state. At this time, the velocity of the positioned object may be 0, and a displacement vector acquired by performing the inertial navigation on the positioned object may be (0,0,0).

In the step S2, the positioned object is controlled, within the next positioning period, to move to obtain the second coordinate B2 of the positioned object in the base station coordinate system at the end of the next positioning period, the inertial navigation is performed on the positioned object within the positioning period to obtain the second inertial navigation result T2, and the displacement vector $P_B$ in the base station coordinate system and the displacement vector $P_T$ in the inertial navigation coordinate system are calculated.

Within the next positioning period, a user may control the positioned object to move to obtain the second coordinate B2 of the positioned object in the base station coordinate system at the end of the next positioning period, and perform the inertial navigation on the positioned object within the positioning period to obtain the second inertial navigation result T2.

The displacement vector $P_B$ in the base station coordinate system may be obtained by B2-B1. The displacement vector in the base station coordinate system may be marked as $P_B$ $(x_B, y_B, z_B)$. That is, the displacement vector in the base station coordinate system may be obtained by subtracting the first coordinate B1 from the second coordinate B2.

The displacement vector $P_T$ in the inertial navigation coordinate system may be obtained by T2-T1. The displacement vector in the inertial navigation coordinate system may be marked as $P_T(x_T, y_T, z_T)$. That is, the displacement vector in the inertial navigation coordinate system may be obtained by subtracting the first inertial navigation result T1 from the second inertial navigation result T2.

In response to using the method for the power-on calibration, since the inertial navigation velocity set in the previous positioning period is 0, the second inertial navigation result T2 obtained by the IMU this time is the displacement vector $P_T$ $(x_T, y_T, z_T)$ in the inertial navigation coordinate system.

In the step S3, the rotation quaternion is calculated according to the displacement vector $P_B$ in the base station coordinate system and the displacement vector $P_T$ in the inertial navigation coordinate system.

The step in which the rotation quaternion is calculated according to the displacement vector $P_B$ in the base station coordinate system and the displacement vector $P_T$ in the inertial navigation coordinate system may include the following steps: a conversion angle α between the displacement vector $P_B$ in the base station coordinate system and the displacement vector $P_T$ in the inertial navigation coordinate system is calculated; and the rotation quaternion Q is calculated according to the conversion angle α and the two displacement vectors.

The conversion angle α between the displacement vector $P_B$ in the base station coordinate system and the displacement vector $P_T$ in the inertial navigation coordinate system may be calculated by using the following formula:

$$\alpha = \arccos \frac{x_T * x_B * + y_T * y_B + z_T * z_B}{\sqrt[2]{x_T^2 + y_T^2 + z_T^2} + \sqrt[2]{x_B^2 + y_B^2 + z_B^2}}$$

The rotation quaternion Q may be calculated according to the conversion angle α and the two displacement vectors by using the following formula:

$$Q = [\cos\frac{\alpha}{2}, (y_T * z_B - y_B * z_T) * \sin\frac{\alpha}{2},$$
$$(x_B * z_T - x_T * z_B) * \sin\frac{\alpha}{2}, (z_T * y_B - z_B * y_T) * \sin\frac{\alpha}{2}]$$

Here, $(x_B, y_B, z_B)$ is the displacement vector $P_B$ in the base station coordinate system, and $(x_T, y_T, z_T)$ is the displacement vector $P_T$ in the inertial navigation coordinate system; a is the conversion angle between the displacement vector $P_B$ in the base station coordinate system and the displacement vector $P_T$ in the inertial navigation coordinate system.

In the embodiments provided by the present disclosure, the rotation quaternion of the base station coordinate system and the inertial navigation coordinate system may be obtained according to the two displacement vectors and the conversion angle between the two displacement vectors. The rotation quaternion describes a rotation process from the inertial navigation coordinate system to the base station coordinate system. The rotation quaternion is the calibration information.

In the step S4, the coordinate obtained by the inertial navigation is transformed, through the rotation quaternion, to the base station coordinate system, and the position of the positioned object after transforming is output.

After the calibration information (i.e., the rotation quaternion) is obtained, the coordinate obtained by the inertial navigation each time may be transformed, through the rotation quaternion, to the base station coordinate system (inertial navigation coordinate points are transformed into quaternion formats and multiplied by the rotation quaternion) for performing inertial navigation transformation and position outputting. In this way, the inertial navigation coordinate system is unified with the base station coordinate system, so that a manual calibration is not required and they can be repeatedly used during use, to reduce measurement errors. On the basis of ensuring positioning accuracy, this method can greatly reduce the complexity of calibration and improve the user experience.

Figure 2:
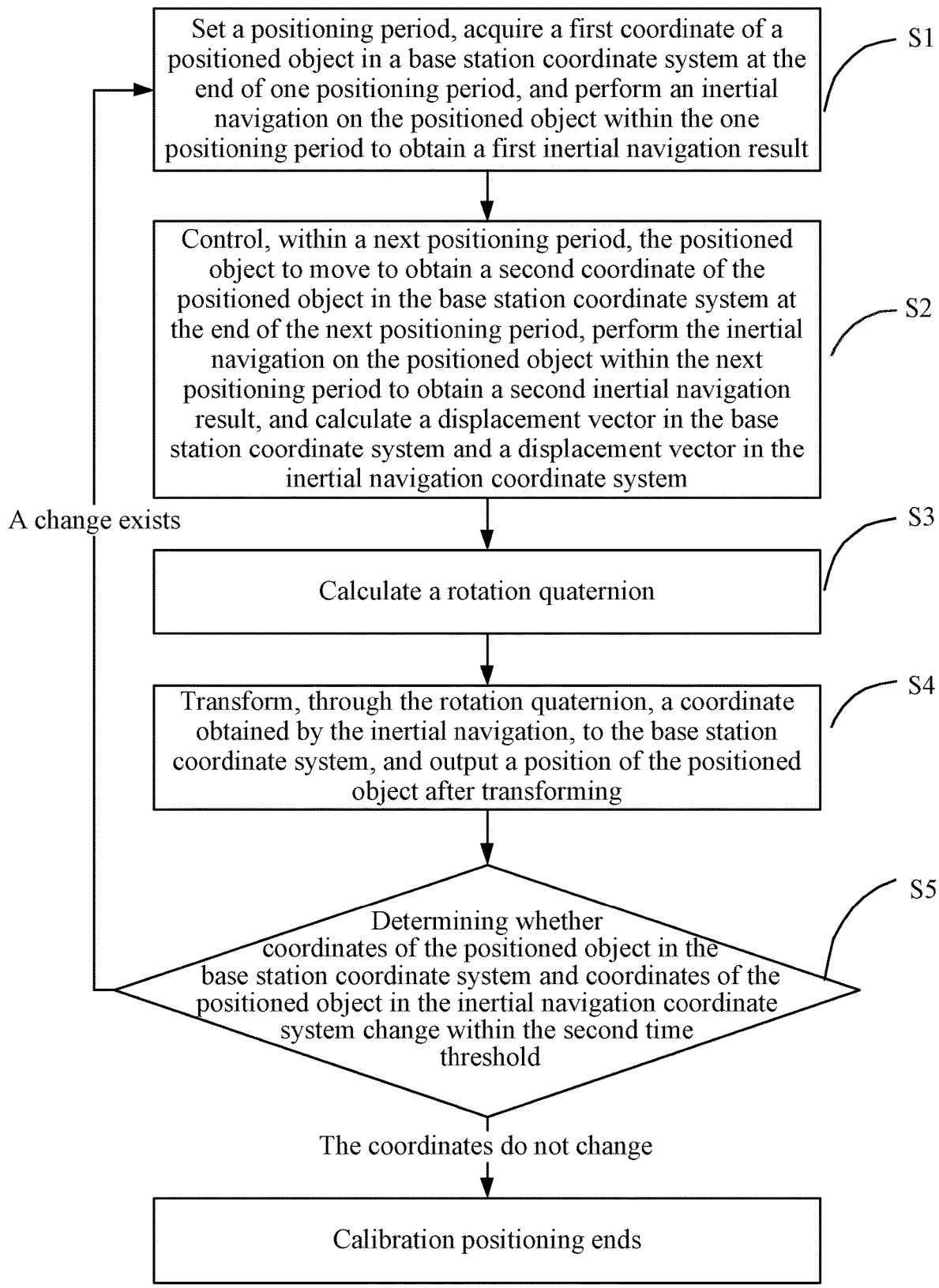
FIG. 2 is a flowchart of a calibration-free positioning method according to another exemplary embodiment of the present application.

As shown in FIG. 2, during continuously calibrating calibration data, after the step S4, the calibration-free positioning method provided by the exemplary embodiment may further include the following: in step S5, it is determined whether coordinates of the positioned object in the base station coordinate system and coordinates of the positioned object in the inertial navigation coordinate system change within a second time threshold; if the coordinates of the positioned object in the base station coordinate system and the coordinates of the positioned object in the inertial navigation coordinate system do not change, calibration positioning ends; if a change exists, the process returns to perform the steps S1 to S4.

In other words, during continuously calibrating calibration data, the steps S1 to S4 described above may be repeated until the coordinates of the positioned object in the base station coordinate system and the coordinates of the positioned object in the inertial navigation coordinate system do not change within the second time threshold, the calibration positioning ends.

The second time threshold may be set during continuously calibrating calibration data. Within the second time threshold, if the coordinates of the positioned object in the base station coordinate system and the coordinates of the positioned object in the inertial navigation coordinate system do not change, it is determined that the positioned object is in the stationary state, and the calibration positioning ends.

During continuously calibrating calibration data, the steps S1 to S4 are repeated, so as to continuously transform, through the rotation quaternion, the coordinate obtained by the inertial navigation to the base station coordinate system to perform the inertial navigation transformation and output the position of the positioned object after transforming. Until the coordinate of the positioned object in the base station coordinate system and the coordinates of the positioned object in the inertial navigation coordinate system do not change within the second time threshold, it is determined that the positioned object is in the stationary state and the calibration positioning ends.

In conclusion, in the calibration-free positioning method provided by the embodiments of the present application, calibration is not performed after the power-on of the positioning base station and the positioned object; after the positioned object moves, the displacement vector in the inertial navigation coordinate system is obtained by performing the inertial navigation on the positioned object, and the displacement vector in the base station coordinate system during the movement of the positioned object is obtained through base station positioning; the calculated conversion angle between the two displacement vectors is the calibration information. The calibration is completed by compensating the conversion angle between the two displacement vectors of the positioned object. On the basis of ensuring positioning accuracy, this method greatly reduces the complexity of the calibration and improves the user experience. This method is not only suitable for power-on calibration, but also for continuous calibrating calibration data during use.

In the embodiments provided by the present disclosure, the positioned object may be a handle, a head-mounted display, a positioner, or a drone. When the positioned object is a handle or a head-mounted display, the acquired center coordinate of the positioning ball may be regarded as the coordinate of the positioned object, or a coordinate of another point acquired according to the center coordinate of the positioning ball may be regarded as the coordinate of the positioned object.

Figure 3:
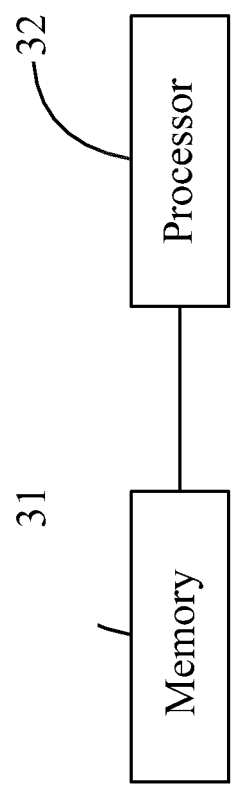
FIG. 3 is a structural diagram of a calibration-free positioning system according to an embodiment of the present application.

An embodiment of the present application further provides a calibration-free positioning system. As shown in FIG. 3, the positioning system includes a processor 32 and a memory 31 storing instructions executable by the processor 32.

The processor 32 may be a general-purpose processor, such as a Central Processing Unit (CPU), a Digital Signal Processor (DSP), an Application Specific Integrated Circuit (ASIC), or one or more integrated circuits configured to implement the embodiments of the present application.

The memory 31 may be configured to store program codes and transmit the program codes to the CPU. The memory 31 may include a volatile memory, such as a Random Access Memory (RAM); the memory 31 may also include a non-volatile memory, such as a read-only memory, a flash memory, a hard disk, or a solid-state hard disk; the memory 31 may further include a combination of the above-mentioned types of memories.

As shown in FIG. 3, the calibration-free positioning system provided by the embodiment of the present application includes the processor 32 and the memory 31. The memory 31 stores a computer program executable on the processor 3. The computer program, when executed by the processor 32, implements the steps described below.

A positioning period is set, a first coordinate B1 of a positioned object in a base station coordinate system at the end of one positioning period is acquired, and an inertial navigation is performed on the positioned object within the one positioning period to obtain a first inertial navigation result T1.

The positioned object is controlled, within a next positioning period, to move to obtain a second coordinate B2 of the positioned object in the base station coordinate system at the end of the next positioning period, the inertial navigation is performed on the positioned object within the positioning period to obtain a second inertial navigation result T2, and a displacement vector $P_B$ in the base station coordinate system and a displacement vector $P_T$ in the inertial navigation coordinate system are calculated.

A rotation quaternion is calculated according to the displacement vector $P_B$ in the base station coordinate system and the displacement vector $P_T$ in the inertial navigation coordinate system; A coordinate obtained by the inertial navigation is transformed, through the rotation quaternion, to the base station coordinate system, and a position of the positioned object after transforming is output.

In an exemplary embodiment, in response to using the system for power-on calibration, the computer program, when executed by the processor 32, may implement the following steps: the first coordinate B1 of the positioned object, which is in a stationary state, in the base station coordinate system is acquired, and the inertial navigation is performed on the positioned object.

In an exemplary embodiment, the computer program, when executed by the processor 32, may implement the following steps: a positioning base station is used to continuously acquire coordinates of the positioned object in the base station coordinate system; a first time threshold is set, and in response to coordinates of the positioned object in the base station coordinate system not changing within the first time threshold, it is determined that the positioned object is the stationary state.

At this time, a velocity of the positioned object may be 0, and a displacement vector acquired by performing the inertial navigation on the positioned object may be (0,0,0).

In an exemplary embodiment, the computer program, when executed by the processor 32, may implement the following steps: a conversion angle α between the displacement vector $P_B$ in the base station coordinate system and the displacement vector $P_T$ in the inertial navigation coordinate system is calculated; and the rotation quaternion Q is calculated according to the conversion angle α and the two displacement vectors.

In an embodiment, the computer program, when executed by the processor 32, implements calculating the rotation quaternion according to the conversion angle and the two displacement vectors through the step described below.

The rotation quaternion is calculated by using the following formula:

$$Q = [\cos\frac{\alpha}{2}, (y_T * z_B - y_B * z_T) * \sin\frac{\alpha}{2},$$
$$(x_B * z_T - x_T * z_B) * \sin\frac{\alpha}{2}, (z_T * y_B - z_B * y_T) * \sin\frac{\alpha}{2}]$$

Here, Q is the rotation quaternion; $(x_B, y_B, z_B)$ is the displacement vector in the base station coordinate system, $(x_T, y_T, z_T)$ is the displacement vector in the inertial navigation coordinate system; α is the conversion angle between the displacement vector in the base station coordinate system and the displacement vector in the inertial navigation coordinate system.

In an exemplary embodiment, the computer program, when executed by the processor 32, implements calculating the conversion angle between the displacement vector in the base station coordinate system and the displacement vector in the inertial navigation coordinate system through the step described below.

The conversion angle is calculated by using the following formula:

$$\alpha = \arccos\frac{x_T * x_B + y_T * y_B + z_T * z_B}{\sqrt[2]{x_T^2 + y_T^2 + z_T^2} + \sqrt[2]{x_B^2 + y_B^2 + z_B^2}}$$

Here, α is the conversion angle between the displacement vector in the base station coordinate system and the displacement vector in the inertial navigation coordinate system, $(x_B, y_B, z_B)$ is the displacement vector in the base station coordinate system, and $(x_T, y_T, z_T)$ is the displacement vector in the inertial navigation coordinate system.

In an exemplary embodiment, the computer program, when executed by the processor 32, implements calculating the displacement vector in the base station coordinate system and the displacement vector in the inertial navigation coordinate system through the following steps: obtaining the displacement vector in the base station coordinate system by subtracting the first coordinate from the second coordinate; and obtaining the displacement vector in the inertial navigation coordinate system by subtracting the first inertial navigation result from the second inertial navigation result.

In an exemplary embodiment, during continuously calibrating calibration data, the computer program, when executed by the processor 32, may implement the following steps: the above-mentioned positioning steps are repeated until coordinates of the positioned object in the base station coordinate system and coordinates of the positioned object in the inertial navigation coordinate system do not change within the second time threshold, and calibration positioning ends.

In addition, an embodiment of the present application further provides a computer-readable storage medium, storing a computer program. The computer program, when executed by a processor, implements the steps of the calibration-free positioning method described above, for example, the steps shown in FIG. 1 or the steps shown in FIG. 2.

Those of ordinary skill in the art can understand that all or some of the steps in the method disclosed above, and functional modules/units in the system, and apparatus disclosed above can be implemented as software, firmware, hardware, and appropriate combinations thereof. In the implementation mode of hardware, the division between functional modules/units mentioned above does not necessarily correspond to the division of physical components; for example, a physical component may have multiple functions, or a function or step may be executed by several physical components cooperatively. Some or all of the components may be implemented as software executed by a processor, such as a digital signal processor or a microprocessor, or implemented as hardware, or implemented as an integrated circuit, e.g. an application-specific integrated circuit. Such software may be distributed on a computer-readable medium, which may include a computer storage medium (or a non-transitory medium) and a communication medium (or a transitory medium). As is known by those of ordinary skill in the art, the term the computer storage medium includes volatile and nonvolatile, removable and non-removable media implemented in any method or technology for storing information (e.g. computer-readable instructions, data structures, program modules, or other data). The computer storage medium includes, but is not limited to, RAM, ROM, EEPROM, flash memory or other memory technologies, CD-ROM, digital versatile disk (DVD) or other optical disk storage, magnetic cassettes, magnetic tapes, magnetic disk storage or other magnetic storage devices, or any other medium used for storing desired information and that can be accessed by a computer. In addition, as is known to those of ordinary skill in the art, the communication medium usually contains computer-readable instructions, data structures, program modules, or other data in a modulation data signal of a transmission mechanism such as a carrier, and may include any information delivery media.

The calibration-free positioning method and system provided by the embodiments of the present application are described in detail above. For those of ordinary skill in the art, any obvious modifications made to it without departing from the essential spirit of the present application will constitute an infringement of the patent right of the present application, and they shall bear corresponding legal liabilities.

What is claimed is:

1. A calibration-free positioning method, comprising:
S1, setting a positioning period, acquiring a first coordinate of a positioned object in a base station coordinate system at an end of one positioning period, and performing an inertial navigation on the positioned object within the one positioning period to obtain a first inertial navigation result;
S2, controlling, within a next positioning period, the positioned object to move to obtain a second coordinate of the positioned object in the base station coordinate system at an end of the next positioning period, performing the inertial navigation on the positioned object within the next positioning period to obtain a second inertial navigation result, and calculating a displacement vector in the base station coordinate system and a displacement vector in an inertial navigation coordinate system;
S3, calculating a rotation quaternion according to the displacement vector in the base station coordinate system and the displacement vector in the inertial navigation coordinate system; and
S4, transforming, through the rotation quaternion, a coordinate obtained by the inertial navigation to the base station coordinate system, and outputting a position of the positioned object after transforming.

2. The calibration-free positioning method of claim 1, wherein in response to using the positioning method for power-on calibration, S1 comprises: acquiring the first coordinate of the positioned object, which is in a stationary state, in the base station coordinate system, and performing the inertial navigation on the positioned object.

3. The calibration-free positioning method of claim 2, before acquiring the first coordinate of the positioned object, which is in the stationary state, in the base station coordinate system, and performing the inertial navigation on the positioned object, the method further comprising:
using a positioning base station to continuously acquire coordinates of the positioned object in the base station coordinate system; and
setting a first time threshold, and in response to coordinates of the positioned object in the base station coordinate system not changing within the first time threshold, determining that the positioned object is in the stationary state.

4. The calibration-free positioning method of claim 3, wherein a velocity of the positioned object in the stationary state is 0, and the displacement vector in the inertial navigation coordinate system obtained by performing the inertial navigation on the positioned object is (0,0,0).

5. The calibration-free positioning method of claim 1, wherein calculating the rotation quaternion according to the displacement vector in the base station coordinate system and the displacement vector in the inertial navigation coordinate system comprises:
calculating a conversion angle between the displacement vector in the base station coordinate system and the displacement vector in the inertial navigation coordinate system; and
calculating the rotation quaternion according to the conversion angle, the displacement vector in the base station coordinate system and the displacement vector in the inertial navigation coordinate system.

6. The calibration-free positioning method of claim 5, wherein calculating the rotation quaternion according to the conversion angle, the displacement vector in the base station coordinate system and the displacement vector in the inertial navigation coordinate system comprises: calculating the rotation quaternion by using a following formula:

$$Q = \left[\cos\frac{\alpha}{2}, (y_T * z_B - y_B * z_T) * \sin\frac{\alpha}{2}, (x_B * z_T - x_T * z_B) * \sin\frac{\alpha}{2}, (z_T * y_B - z_B * y_T) * \sin\frac{\alpha}{2}\right]$$

wherein Q is the rotation quaternion, $(x_B, y_B, z_B)$ is the displacement vector in the base station coordinate system, $(x_T, y_T, z_T)$ is the displacement vector in the inertial navigation coordinate system, and $\alpha$ is the conversion angle between the displacement vector in the base station coordinate system and the displacement vector in the inertial navigation coordinate system.

7. The calibration-free positioning method of claim 5, wherein calculating the conversion angle between the displacement vector in the base station coordinate system and the displacement vector in the inertial navigation coordinate system comprises:
calculating the conversion angle by using a following formula:

$$\alpha = \arccos \frac{x_T * x_B * + y_T * y_B + z_T * z_B}{\sqrt[2]{x_T^2 + y_T^2 + z_T^2} + \sqrt[2]{x_B^2 + y_B^2 + z_B^2}}$$

wherein $\alpha$ is the conversion angle between the displacement vector in the base station coordinate system and the displacement vector in the inertial navigation coordinate system, $(x_B, y_B, z_B)$ is the displacement vector in the base station coordinate system, and $(x_T, y_T, z_T)$ is the displacement vector in the inertial navigation coordinate system.

8. The calibration-free positioning method of claim 1, wherein calculating the displacement vector in the base station coordinate system and the displacement vector in the inertial navigation coordinate system comprises:
obtaining the displacement vector in the base station coordinate system by subtracting the first coordinate from the second coordinate; and
obtaining the displacement vector in the inertial navigation coordinate system by subtracting the first inertial navigation result from the second inertial navigation result.

9. The calibration-free positioning method of claim 1, wherein transforming, through the rotation quaternion, the coordinate obtained by the inertial navigation to the base station coordinate system comprises:
transforming the coordinate obtained by the inertial navigation into a quaternion format and multiplying the coordinate with the quaternion format by the rotation quaternion to obtain a coordinate in the base station coordinate system.

10. The calibration-free positioning method of claim 1, further comprising:
during continuously calibrating calibration data, repeating S1 to S4 until coordinates of the positioned object in the base station coordinate system and coordinates of the positioned object in the inertial navigation coordinate system do not change within the second time threshold, and ending calibration positioning.

11. A computer-readable storage medium, storing a computer program, wherein the computer program, when executed by a processor, implements the steps of the calibration-free positioning method of claim 1.

12. A calibration-free positioning system, comprising a processor and a memory, wherein the memory stores a computer program executable on the processor, and the computer program, when executed by the processor, implements following steps:
   S1, setting a positioning period, acquiring a first coordinate of a positioned object in a base station coordinate system at an end of one positioning period, and performing an inertial navigation on the positioned object within the one positioning period to obtain a first inertial navigation result;
   S2, controlling, within a next positioning period, the positioned object to move to obtain a second coordinate of the positioned object in the base station coordinate system at an end of the next positioning period, performing the inertial navigation on the positioned object within the next positioning period to obtain a second inertial navigation result, and calculating a displacement vector in the base station coordinate system and a displacement vector in the inertial navigation coordinate system;
   S3, calculating a rotation quaternion according to the displacement vector in the base station coordinate system and the displacement vector in the inertial navigation coordinate system; and
   S4, transforming, through the rotation quaternion, a coordinate obtained by the inertial navigation to the base station coordinate system, and outputting a position of the positioned object after transforming.

13. The calibration-free positioning system of claim 12, wherein in response to using the positioning system for power-on calibration, the computer program, when executed by the processor, further implements following steps:
   acquiring the first coordinate of the positioned object, which is in a stationary state, in the base station coordinate system, and performing the inertial navigation on the positioned object.

14. The calibration-free positioning system of claim 13, wherein the computer program, when executed by the processor, further implements following steps:
   using a positioning base station to continuously acquire coordinates of the positioned object in the base station coordinate system; and
   setting a first time threshold, and response to coordinates of the positioned object in the base station coordinate system not changing within the first time threshold, determining that the positioned object is in the stationary state.

15. The calibration-free positioning system of claim 14, wherein a velocity of the positioned object in the stationary state is 0, and the displacement vector in the inertial navigation coordinate system obtained by performing the inertial navigation on the positioned object is (0,0,0).

16. The calibration-free positioning system of claim 12, wherein the computer program, when executed by the processor, implements calculating the rotation quaternion according to the displacement vector in the base station coordinate system and the displacement vector in the inertial navigation coordinate system through following steps:
   calculating a conversion angle between the displacement vector in the base station coordinate system and the displacement vector in the inertial navigation coordinate system, and calculating the rotation quaternion according to the conversion angle, the displacement vector in the base station coordinate system and the displacement vector in the inertial navigation coordinate system.

17. The calibration-free positioning system of claim 16, wherein the computer program, when executed by the processor, implements calculating the rotation quaternion according to the conversion angle, the displacement vector in the base station coordinate system and the displacement vector in the inertial navigation coordinate system through a following step:
   calculating the rotation quaternion by using a following formula:

$$Q = [\cos\frac{\alpha}{2}, (y_T * z_B - y_B * z_T) * \sin\frac{\alpha}{2},$$
$$(x_B * z_T - x_T * z_B) * \sin\frac{\alpha}{2}, (z_T * y_B - z_B * y_T) * \sin\frac{\alpha}{2}]$$

wherein Q is the rotation quaternion, $(x_B, y_B, z_B)$ is the displacement vector in the base station coordinate system, $(x_T, y_T, z_T)$ is the displacement vector in the inertial navigation coordinate system, and $\alpha$ is the conversion angle between the displacement vector in the base station coordinate system and the displacement vector in the inertial navigation coordinate system.

18. The calibration-free positioning system of claim 16, wherein the computer program, when executed by the processor, implements calculating the conversion angle between the displacement vector in the base station coordinate system and the displacement vector in the inertial navigation coordinate system through a following step:
   calculating the conversion angle by using a following formula:

$$\alpha = \arccos\frac{x_T * x_B * + y_T * y_B + z_T * z_B}{\sqrt[2]{x_T^2 + y_T^2 + z_T^2} + \sqrt[2]{x_B^2 + y_B^2 + z_B^2}}$$

wherein $\alpha$ is the conversion angle between the displacement vector in the base station coordinate system and the displacement vector in the inertial navigation coordinate system, $(x_B, y_B, z_B)$ is the displacement vector in the base station coordinate system, and $(x_T, y_T, z_T)$ is the displacement vector in the inertial navigation coordinate system.

19. The calibration-free positioning system of claim 12, wherein the computer program when executed by the processor, implements calculating the displacement vector in the base station coordinate system and the displacement vector in the inertial navigation coordinate system through following steps:
   obtaining the displacement vector in the base station coordinate system by subtracting the first coordinate from the second coordinate; and
   obtaining the displacement vector in the inertial navigation coordinate system by subtracting the first inertial navigation result from the second inertial navigation result.

20. The calibration-free positioning system of claim 12, wherein the computer program, when executed by the processor, further implements following steps:
   during continuously calibrating calibration data, repeating S1 to S4 until coordinates of the positioned object in the base station coordinate system and coordinates of the positioned object in the inertial navigation coordinate system do not change within the second time threshold, and ending calibration positioning.

\* \* \* \* \*